(12) United States Patent
Clark et al.

(10) Patent No.: US 10,759,702 B2
(45) Date of Patent: Sep. 1, 2020

(54) FORMING A CERAMIC PRODUCT

(71) Applicant: Mantec Technical Ceramics Limited, Stoke-on-Trent (GB)

(72) Inventors: Andrew Christopher Clark, Stoke-on-Trent (GB); Stewart Saunders, Stoke-on-Trent (GB)

(73) Assignee: MANTEC TECHNICAL CERAMICS LIMITED, Stoke-on-Trent (GB)

( * ) Notice: Subject to any disclaimer, the term of this patent is extended or adjusted under 35 U.S.C. 154(b) by 391 days.

(21) Appl. No.: 15/327,031

(22) PCT Filed: Jul. 13, 2015

(86) PCT No.: PCT/GB2015/052014
§ 371 (c)(1),
(2) Date: Jan. 17, 2017

(87) PCT Pub. No.: WO2016/009183
PCT Pub. Date: Jan. 21, 2016

(65) Prior Publication Data
US 2017/0166483 A1    Jun. 15, 2017

(30) Foreign Application Priority Data
Jul. 17, 2014 (GB) .................................. 1412683.3

(51) Int. Cl.
*C04B 33/32* (2006.01)
*B28B 3/20* (2006.01)
(Continued)

(52) U.S. Cl.
CPC ............... *C04B 33/32* (2013.01); *B28B 1/50* (2013.01); *B28B 3/02* (2013.01); *B28B 3/04* (2013.01); *B28B 3/20* (2013.01); *B28B 11/243* (2013.01); *B28C 3/00* (2013.01); *C04B 33/04* (2013.01); *C04B 33/30* (2013.01); *C04B 35/04* (2013.01); *C04B 35/10* (2013.01); *C04B 35/14* (2013.01); *C04B 35/18* (2013.01); *C04B 35/185* (2013.01); *C04B 35/195* (2013.01); *C04B 35/20* (2013.01); *C04B 35/481* (2013.01);
(Continued)

(58) Field of Classification Search
CPC ...................................................... C04B 33/32
See application file for complete search history.

(56) References Cited

FOREIGN PATENT DOCUMENTS

| | | |
|---|---|---|
| CN | 103804002 A | 5/2014 |
| DE | 10111487 A1 | 9/2002 |
| JP | 2005272281 A | 10/2005 |

OTHER PUBLICATIONS

Translation of Ishiguro (JP 2005/272281).*
(Continued)

*Primary Examiner* — Larry W Thrower
(74) *Attorney, Agent, or Firm* — Han Santos, PLLC

(57) ABSTRACT

A method of forming a ceramic product, the method comprising producing a ceramic forming mixture in the form of a slurry, causing the slurry to form, extruding the formed slurry to produce a plurality of lengths of extruding material each with a diameter of less than 10 mm, firing the extruded material so as to partially sinter the extruded material, forming the partially sintered extruded material into a required shape for a product, and subsequently firing the shaped partially sintered extruded material to form the ceramic product.

20 Claims, 1 Drawing Sheet

(51) Int. Cl.

| | |
|---|---|
| *C04B 38/10* | (2006.01) |
| *C04B 35/64* | (2006.01) |
| *C04B 35/185* | (2006.01) |
| *C04B 35/48* | (2006.01) |
| *B28B 1/50* | (2006.01) |
| *C04B 35/14* | (2006.01) |
| *C04B 35/195* | (2006.01) |
| *C04B 35/10* | (2006.01) |
| *C04B 35/04* | (2006.01) |
| *C04B 35/565* | (2006.01) |
| *B28C 3/00* | (2006.01) |
| *C04B 35/18* | (2006.01) |
| *C04B 35/20* | (2006.01) |
| *B28B 3/02* | (2006.01) |
| *B28B 3/04* | (2006.01) |
| *B28B 11/24* | (2006.01) |
| *C04B 33/04* | (2006.01) |
| *C04B 33/30* | (2006.01) |
| *C04B 35/626* | (2006.01) |
| *C04B 35/632* | (2006.01) |
| *C04B 35/638* | (2006.01) |
| *C04B 111/00* | (2006.01) |

(52) U.S. Cl.
CPC ........ *C04B 35/565* (2013.01); *C04B 35/6264* (2013.01); *C04B 35/632* (2013.01); *C04B 35/638* (2013.01); *C04B 35/64* (2013.01); *C04B 38/10* (2013.01); *C04B 2111/00129* (2013.01); *C04B 2235/349* (2013.01); *C04B 2235/602* (2013.01); *C04B 2235/606* (2013.01); *C04B 2235/6021* (2013.01); *C04B 2235/612* (2013.01); *C04B 2235/656* (2013.01); *C04B 2235/6567* (2013.01); *Y02P 40/63* (2015.11)

(56) References Cited

OTHER PUBLICATIONS

CN201580045519.4, Office Action dated Mar. 8, 2019, 5 pages.
International Application No. PCT/GB2015/052014, International Search Report and Written Opinion dated Sep. 15, 2015, 9 pages.

* cited by examiner

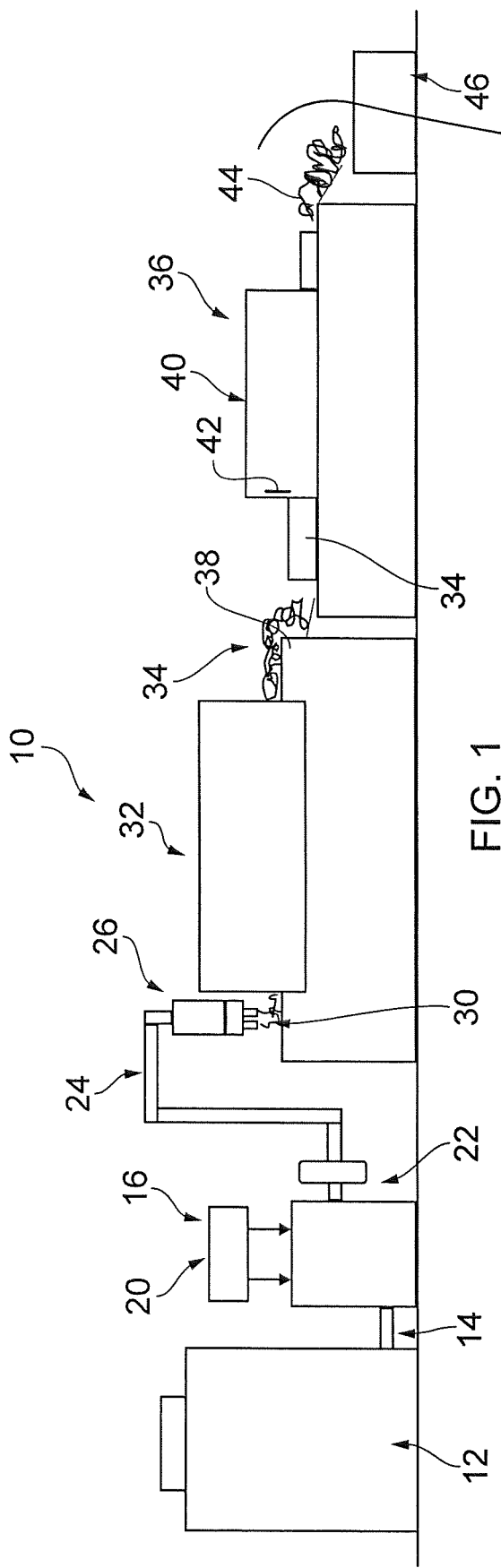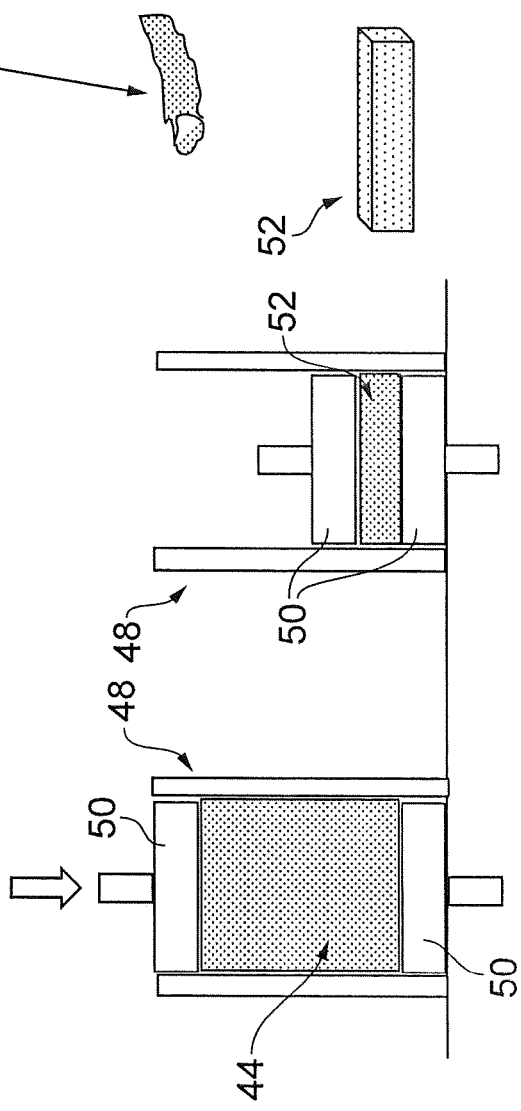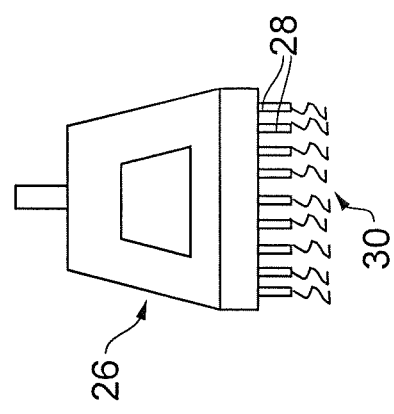

FORMING A CERAMIC PRODUCT

This invention concerns a method of forming a ceramic product, a product made by such a method, and also apparatus for forming a ceramic product.

There are two main generic products on the market for kiln refractory linings: ceramic fibre and refractory bricks. The decision to pick one product over the other is very much based on the type of product being fired, the firing cycle and the type of kiln. Fast-fired products are generally fired in fibre-lined kilns. Longer higher temperature fired products are generally fired in brick lined kilns.

Refractory bricks are generally either produced via extrusion or pressing. They are pre-fired prior to sale and are then bonded together using refractory cement by refractory brick layers to form rigid fixed wall kiln linings. Once brick linings are installed, they usually last for many years if not decades. However, by virtue of them being bricks they are relatively dense and have relatively higher thermal mass/conductivity, in comparison to ceramic fibre.

High temperature ceramic fibre has a lower thermal mass/conductivity than refractory bricks. The main benefit of fibre is that it fires much more quickly than brick lined kilns. The lower thermal mass lining allows the kiln to heat up and cool down quicker than kilns lined with refractory bricks. This lends itself to lower energy costs per firing and increased capacity as the kiln can be fired quicker. However, there is a down side with ceramic fibre at high temperatures i.e. higher than 1550° C., with it degrading/shrinking prematurely and generally not having the same working life as bricks. When it has reached the end of its life ceramic fibre has to be treated as hazardous waste requiring specialist extraction precautions and breathing apparatus.

All percentages expressed in this specification are weight percentages.

According to a first aspect of the invention there is provided a method of forming a ceramic product, the method comprising producing a ceramic forming mixture in the form of a slurry, causing the slurry to form, extruding the formed slurry to produce a plurality of lengths of extruded material each with a diameter of less than 10 mm, firing the extruded material so as to partially sinter the extruded material, forming the partially sintered extruded material into a required shape for a product, and subsequently firing the shaped partially sintered material to form the ceramic product.

The lengths of extruded material may be cut or broken into a plurality of pieces prior to forming into a required shape, and the pieces may be less than 25 mm long.

To cause the slurry to form, air may be fed into the slurry, and the air and slurry mixed together to entrain the air within the slurry. The air may be fed into the slurry as compressed air, and the compressed air may be at a volume of between 0.2 and 2 litres/min.

A forming agent may be added to the slurry to aid forming, and the forming agent may be an organic amine oxide.

The forming agent may be drip dosed into the slurry, and may be drip dosed at a rate of between 2 and 15 ml/mins. To cause the slurry to form, the slurry and air may be fed into a forming unit, which unit may comprise a plurality of relatively rotating rotors and stators, which may rotate at a speed of between 200 and 500 rpm.

An increased pressure will be developed in the forming unit, which increased pressure may be between 20 and 80 psi.

A feed pipe may be provided extending from the forming unit to an extruding unit.

A setting agent may be added to the slurry. The setting agent may be any of gypsum, calcium aluminate cements, Portland cements, PVA plus cross linking polymer additives, alginates or starches.

The ceramic forming mixture may be mixed together by a high speed blunger.

The ceramic forming mixture may include:
10-40% water
20-80% of a ceramic forming material
2-10% of additives The ceramic forming material may be any of alumina which may be calcined, fused or tabular, silica, magnesium oxide, silicon carbide, zirconium silicate, silliminite, mullite, steatite or cordierite.

The additives may include any of organic binders, methyl cellulose, starches, gums, polyvinyl acetate, polyvinyl alcohol, polyethylene glycol, polyethylene oxide, polyacrylates, alginates, waxes and wax emulsions.

The additives may include an organic deflocculant, which may be sodium tripolyphosphate.

The ceramic forming mixture may also include up to 50% clay to form a slurry, which may be ball or china clay.

Prior to firing the extruded material may be dried. The drying of the extruded material may be carried out at a temperature of between 500 and 750° C.

The drying of the extruded material may be carried out for less than ten minutes, and may be carried out for between one and five minutes, and may be carried out for between two and four minutes.

The drying of the extruded material may be carried out in a conveyor drier through which a conveyor carrying the extruded material passes. Infra red heaters may be provided for the drier.

The firing of the extruded material may be carried out at a temperature of up to 1250° C., and may be carried out at a temperature of between 800 and 1250° C.

The firing of the extruded material may be carried out for less than ten minutes, may be carried out for between one and five minutes, and may be carried out for between two and four minutes.

The firing of the extruded material may be carried out in a kiln through which a conveyor carrying the extruded material passes, and the conveyor may comprise a mesh belt which may be made of heat resistant metal.

The depth of the extruded material during firing may be controlled. A gate may be provided at the entrance of the kiln, which gate may be adjustable, to restrict the depth of material of the kiln. The depth of material on the kiln may be between 2 and 10 cm.

The firing of the extruded material may be carried out with the conveyor substantially fully covered with extruded material as it passes through the kiln.

The forming of the partially sintered extruded material into a required shape may be carried out by pressing the extruded material in a mould of a required shape.

The partially sintered extruded material may be pressed such that its thickness reduces during pressing by at least a factor of four, and more particularly by a factor of approximately five.

The shaped partially sintered extruded product may be fired at a temperature above 1200° C., and may be fired at a temperature of between 1400 and 1750° C.

According to a second aspect of the invention there is provided a ceramic product made by a method according to any of the preceding twenty four paragraphs.

According to a third aspect of the invention there is provided apparatus for forming a ceramic product, the apparatus including a mixing unit for mixing together components of a ceramic forming mixture, the mixing unit being connected to a forming unit for causing the slurry to form, the forming unit connecting to a die unit for extruding formed mixture there-through to produce a plurality of lengths of extruded material each with a diameter of less than 10 mm, the die unit being connected to a kiln for partially sintering the extruded material.

The mixing unit may be in the form of a high speed blunger.

A pump may be provided for pumping slurry from the mixing unit to the forming unit, and the pump may be a fixed displacement pump.

A sieve may be provided between the mixing unit and the forming unit to remove particles above a predetermined size such as for instance 2 mm.

The forming unit may include an inlet for compressed air to be mixed with the slurry. The forming unit may include an inlet for a foaming agent, and may permit drip dosing of the forming agent.

The forming unit may comprise a plurality of relatively rotating rotors and stators for entraining the air in the slurry, and the rotors and stators may rotate at a speed of between 200 and 500 rpm. A feed pipe may be provided extending from the forming unit to the extruding unit.

The apparatus may include a cutter arrangement, for cutting the extruded material to required lengths.

A drier may be provided between the die unit and the kiln. The drier may be in the form of a conveyor drier and may have infrared heaters.

The kiln may comprise a belt kiln through which a conveyor carrying the extruded material passes, and the conveyor may comprise a mesh belt which may be made of heat resistant metal.

A gate may be provided at the entrance to the kiln to restrict the height of material on the kiln, and the gate height may be adjustable.

The apparatus may include a press and a mould for forming the partially sintered extruded material into a required shape.

An embodiment of the present invention will now be described by way of example only and with reference to the accompanying drawings, in which:

FIG. 1 is a diagrammatic side view of apparatus according to the invention;

FIG. 2 is a more detailed diagrammatic side view of part of the apparatus of FIG. 1; and FIGS. 3 to 5 are diagrammatic sequential side views of apparatus according to the invention in use.

FIG. 1 shows an apparatus 10 according to the invention for producing ceramic products by a method of the invention. The apparatus 10 comprises a mixing unit 12 which includes a high speed blunger.

The mixing unit 12 also includes a conventional fixed displacement pump (not shown) which pumps material through a magnet and a sieve to remove any solid or unmixed particles of say greater than 2 mm. The pump connects to a pipe 14 which leads to a forming unit 16.

The forming unit 16 includes a unit 20 connected thereto. The unit 20 permits compressed air to be fed into the slurry at a volume of between 0.2 and 2 litres/min. The unit 20 also permits a foaming agent to be dripped dosed into the mixture.

The forming unit 16 also includes a mixing head 22 to receive the air rated slurry incorporating the forming agent. The mixing head includes a series of relatively rotating rotors and stator blades nesting together which spin around at 200-500 rpm to entrain and fully mix the air into the slurry in a whisking like action. This produces form air bubbles in the ceramic slurry which stay embedded within the slurry without bursting or slumping. The forming agent provides temporary green strength to maintain the bubbles in the form structure.

A natural increased pressure of between 20 and 80 psi will build up in the mixing head 22. This increased pressure is sufficient to push material through a feed pipe 24 into a die unit 26. The die unit 26 as shown in FIG. 2 includes a plurality of outlet nozzles 28 which produce a plurality of lengths of extruded material 30 each with a diameter of less than 10 mm.

The die unit 26 is located to supply the extruded material 30 to a conveyor drier 32 which is provided with infra-red heaters. The drier 32 is arranged such that the extruded material passes therethrough in around 2½ minutes, and the drier 32 operates at a temperature of around 700° C.

Dried extruded material 34 passes from the heater 32 to a belt kiln 36. As the dried extruded material 34 drops over an edge 38 to the kiln 36, the lengths of dried extruded material 34 will tend to break up.

The kiln 36 includes a firing zone 40 with a sluice gate 42 at the entrance of the kiln 36. The sluice gate 42 monitors the depth of material on the heat resistant metal belt passing through the firing zone 40. The sluice gate 42 is height adjustable, and typically the depth of dried extruded material passing on to the belt of the kiln 36 will be between 2 and 10 cm. The kiln 36 is arranged such that potentially the whole of the belt within the firing zone 40 is covered in dried extruded material, thereby protecting the belt during firing.

The dried extruded material would typically be flash fired for around 2½ minutes in the firing zone 40 at a temperature of around 1200° C. This causes the dried extruded material to be partially sintered, with particularly for instance the material at the top of the layer of material on the belt being perhaps fully sintered, whilst the material at the bottom of the pile on the belt is at most partially sintered.

This partially sintered material 44 passes into a hopper 46, and again the lengths of partially sintered material 44 will tend to break up as it passes into the hopper 46. The partially sintered material 44 would tend to be partially grey and partially white in appearance. The grey parts are at most partially sintered and may not be at all sintered, whilst the white parts are substantially sintered. The white parts will be relatively hard with smaller micro pores, whilst the grey parts will be softer and have larger micro pores, but can be significantly compressed.

The partially sintered material 44 is introduced into a mould 48 and compressed by dies 50 by a factor of for instance five to produce a partially sintered pressed ceramic brick or block 52. The partially sintered brick or block 52 can be fired, if appropriate immediately, without the requirement for instance of pre-drying.

The brick or block 52 has a final firing at around 1750° C. for around twelve hours cold to cold. Such firing is generally quicker than comparable firing of refractory bricks not made by this method. The blocks or bricks 52 can be brought up to maximum temperature more quickly, and as indicated fired more quickly than conventionally due for instance to the fact that no binders have to be burned out. Methods according to the present invention could be used for instance with products having no clay product as the partially sintered material will bind itself sufficiently prior to final firing.

In one example a high alumina ceramic with approximately 70% alumina and other materials is mixed in the mixing unit 12 to form a slurry with a solids content of approximately 70%. The slurry is then pumped through the pipe 14 into the forming unit 16. Any solid or unmixed particles greater than 2 mm are removed by the sieve or magnet.

Compressed air is fed into the slurry at a required volume of between 0.2 and 2 litres/min, and an organic amine oxide forming agent is drip dosed into the slurry at a rate of between 2 and 15 ml/min. This mixture is then mixed at high speed in the mixing head 22 to entrain the air and create form air bubbles in the ceramic slurry. An increased pressure of between 20 and 80 psi develops in the mixing head 22. The forming agent provides temporary green strength to these bubbles prior to firing.

A setting agent such as gypsum, calcium aluminate cements, Portland cements, PVA plus cross linking polymer additives, alginates or starches may be injected into the slurry to aid the forming process. The setting agent may include accelerants or retardants.

The formed mixture is then passed under pressure through the feed pipe 24 into the die unit 26 and as show in FIG. 2 is extruded into relatively fine lengths 30. In this instance the material 30 has a diameter of around 5 mm, but a parameter could be chosen perhaps of between 1 and 10 mm as required.

The aerated extruded lengths 30 pass into the drier 32 with a working temperature of up to 700° C. The aerated extruded material 30 remains in the drier 32 for around 2½ minutes. The dried material 34 exiting the drier 32 typically has a moisture content of around 10 to 20%. Substantially all of this moisture will subsequently be driven off in the kiln 36. Some or the organic content of the starting ceramic material will be burnt off, but some will remain providing some plasticity to the material which aids subsequent pressing.

As indicated in the kiln 36 the material 34 is flash fired such that partial sintering takes place, with increased sintering at the top of the controlled depth layer of material 34 passing through the kiln 36 on the heat resistant metal belt. Providing material 34 fully across the belt provides protection thereto and extends the temperature at which the conveyor belt can operate, and protects its deterioration in use. Flash firing takes place for around 2½ minutes in the kiln 36 at a maximum temperature of around 1200° C.

The partially sintered material 44 can be pressed in appropriate moulds. During pressing the material may reduce for instance in height in the mould by around a factor of five, and a pressing pressure for instance of up to around one ton may be applied depending on the surface area of the product being pressed. The softer less sintered grey material breaks down during the pressing process and acts as a pressing aid to hold the harder sintered white material together in the pressed shape.

The shaped product now formed can be manually handled and can be fired to form the required product. The product is fired at a temperature generally in excess of 1400° C. As the moisture has largely already been driven off in the kiln 36, along with some of the organic content of the material, the subsequent firing can take place relatively quickly, with the product being brought up to maximum temperature relatively quickly without the conventional dangers of cracking or other spoiling of the product.

The products thus formed can be cut further if required into precise shapes for use for instance in lining a kiln or in other refractory applications. These products typically have a 65-95% alumina content.

This method and apparatus is very suitable for producing pressed product ready to be fired from raw material, in less than ten minutes. The low density bricks or blocks produced do not need to be dried, and can be fast fired straight from the press, thereby enabling generally quicker firing as noted above.

It is important that the partial sintering make up of the material is maintained, and this can be achieved by the speed of travel through the kiln, the thickness of material passing through the kiln and the peak firing temperature.

A wide range of modifications may be made without departing from the scope of the invention. For instance different parameters may be applied to the size of the extruded material and/or the heating or firing conditions.

This apparatus and/or method can be used with a wide range of ceramic materials, other than the above described example. For example different proportions of alumina could be used, and the alumina may be calcined, fused or tabular. Other ceramic forming materials may be used alone or in combination, such as silica, magnesium oxide, silicon carbide, zirconium silicate, silliminite, mullite, steatite or cordierite. Clay of up to 50% may be added, which may be ball or china clay. It is also capable of producing formulations without any clay content.

Additives in the starting mixture may include organic binders, methyl cellulose, starches, polyvinyl acetate or other suitable binders. The additives may include an organic deflocculant, which may be sodium tripolyphosphate.

A different mixing unit could be used to entrain the air in the slurry. The die unit may take a different form. The firing conditions for the final product will depend on the nature of the material. An after burner will generally be required in the process due to the combustion products produced from any remaining binders from the partially pre sintered material.

In practice the invention has been found to produce a product with a tightly controlled pore size distribution, with a formed ceramic micro porous internal structure. This product provides two main benefits.

Firstly, it has an intimately mixed, homogenous micro porous structure all the way through the component, and secondly it has a much lower resultant bulk density over conventional continuous manufacturing techniques for ceramic shapes. This combination of properties lends itself to superior refractory components for use inside industrial kilns and furnaces. This structure is ideal for a refractory insulating product.

Fired densities of around half that of existing traditionally pressed/extruded bricks can be achieved with this process due to the high porosity of the aerated material and gentle low pressing pressure required to bind the shapes together. This low density in combination with a resultantly low thermally conductivity produces a low density high alumina brick which has superior energy saving characteristic with subsequently higher strength than the existing commercially available Insulation firebricks on the market. Fired Densities of around 0.3-0.6 g/cc can be achieved with thermal conductivities below 0.35 W/M/J with improved compressive strengths.

This therefore provides a material which can have the rigidity and longevity of a brick, but has a much lighter bulk density and therefore provides significant energy saving. Products made with this material could be retro fitted as well as fitted into new installations.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of forming a single ceramic product, the method comprising:
    producing a ceramic forming mixture in the form of a slurry;
    causing the slurry to form, extruding the formed slurry to produce a plurality of lengths of extruded material each with a diameter of less than 10 mm;
        firing a layer formed of the plurality of lengths of the extruded material so as to partially sinter the plurality of lengths of extruded material, with increased sintering at the top of the layer and less sintering at the bottom of the layer;
        pressing multiple lengths of the partially sintered extruded material into a shape comprising the pressed multiple lengths of the partially sintered extruded material, wherein the shape is a required shape for the single ceramic product;
        wherein the less sintered lengths of extruded material break down during the pressing process and act as a pressing aid to hold the more sintered lengths of extruded material together in the pressed shape; and
        subsequently firing the shape to form the single ceramic product.

2. The method according to claim 1, wherein the lengths of extruded material are cut or broken into a plurality of pieces prior to forming into the required shape.

3. The method according to claim 2, wherein the pieces are less than 25 mm long.

4. The method according to claim 1, wherein a foaming agent is added to the slurry to aid forming.

5. The method according to claim 1, wherein the causing the slurry to form includes feeding air into the slurry, and the air and slurry mixed together to entrain the air within the slurry;
    wherein the causing the slurry to form includes feeding the slurry and air into a forming unit.

6. The method according to claim 5, wherein the causing the slurry to form includes feeding the slurry and air into a forming unit.

7. The method according to claim 1, wherein a setting agent is added to the slurry.

8. The method according to claim 1, wherein the ceramic forming mixture includes:
    10-40% water
    20-80% of a ceramic forming material; and
    2-10% of additives.

9. The method according to claim 8, wherein the ceramic forming material is any of alumina which may be calcined, fused or tabular, silica, magnesium oxide, silicon carbide, zirconium silicate, silliminite, mullite, steatite or cordierite; and
    wherein the additives include any of organic binders, methyl cellulose, starches, gums, polyvinyl acetate, polyvinyl alcohol, polyethylene glycol, polyethylene oxide, polyacrylates, alginates, waxes and wax emulsions.

10. The method according to claim 8, wherein the additives include any of organic binders, methyl cellulose, starches, gums, polyvinyl acetate, polyvinyl alcohol, polyethylene glycol, polyethylene oxide, polyacrylates, alginates, waxes and wax emulsions.

11. The method according to claim 8, wherein the ceramic forming mixture includes up to 50% clay to form a slurry.

12. The method according to claim 1, wherein prior to firing the plurality of lengths of extruded material is dried;
    wherein drying of the plurality of lengths of extruded material is carried out at a temperature of between 500 and 750° C.

13. The method according to claim 12, wherein drying of the extruded material is carried out at a temperature of between 500 and 750° C.

14. The method according to claim 1, wherein the firing of the plurality of lengths of extruded material is carried out for less than ten minutes.

15. The method according to claim 1, wherein the pressing of the multiple lengths of partially sintered extruded material into the required shape comprising the pressed multiple lengths of the partially sintered extruded material is carried out by pressing the extruded material in a mould of the required shape.

16. The method according to claim 1, wherein the shape is fired at a temperature above 1200° C.

17. The method according to claim 1, wherein the depth of the layer of the plurality of lengths of extruded material during firing is controlled, and wherein the resulting plurality of lengths of partially sintered material is partially grey and partially white in appearance, wherein the grey lengths of extruded material are at most partially sintered, wherein the white lengths of extruded material are substantially sintered, wherein the grey lengths of extruded material have relatively larger micropores and the white lengths of extruded material have relatively smaller micropores.

18. The method according to claim 1, wherein firing the layer of the plurality of lengths of the extruded material so as to partially sinter the plurality of lengths of extruded material is a continuous gradient firing process, with the most sintering occurring at the top of the layer and a decreasing amount of sintering occurring moving down from the top of the layer to the bottom of the layer.

19. The method according to claim 1, wherein extruding the formed slurry to produce the plurality of lengths of extruded material includes extruding the formed slurry through a die unit to produce the plurality of lengths of extruded material, wherein the die unit comprises a plurality of nozzles which produce the plurality of lengths of extruded material.

20. The method according to claim 1, wherein the ceramic product has a density of 0.3-0.6 g/cc.

* * * * *